United States Patent [19]
Smith et al.

[11] 3,905,155
[45] Sept. 16, 1975

[54] TIRE MOLD CLEANING APPARATUS

[75] Inventors: Leonard R. Smith; Emmett J. Kelly, both of Topeka, Kans.

[73] Assignee: Midwest Machine Works, Inc., Topeka, Kans.

[22] Filed: Nov. 29, 1973

[21] Appl. No.: 420,103

[52] U.S. Cl. .................................. 51/8 R; 51/319
[51] Int. Cl.² ...................... B24C 3/16; B24C 3/32
[58] Field of Search ................ 51/8 R, 9, 319–321, 51/281 P

[56] References Cited
UNITED STATES PATENTS

| | | | |
|---|---|---|---|
| 955,469 | 4/1910 | Motz | 51/8 R |
| 2,479,299 | 8/1949 | Biggs | 51/8 R |
| 2,766,557 | 10/1956 | Pollard | 51/8 R |

Primary Examiner—Donald G. Kelly
Attorney, Agent, or Firm—Lowe, Kokjer, Kircher

[57] ABSTRACT

For use with abrasive blasting and recovery equipment, a rotary hone to be placed within a tire curing press to clean the tire molds thereof. The apparatus comprises a rotatable hood having associated therewith a directionally adjustable spray head for delivering a blast of abrasive to the tire mold surface to remove vulcanization residue. A supporting frame on which the rotatable hood is mounted overlies in engaging fashion the tire mold and also provides a perimetric gap between the hood and supporting frame whereby air sweeps through such opening when a vacuum is drawn centrally of the hood in order to pick up dislodged residue and abrasive for return to the reclaim system of the blasting equipment.

7 Claims, 7 Drawing Figures

3,905,155
Fig. 1.
Fig. 3.
Fig. 4.
Fig. 2.
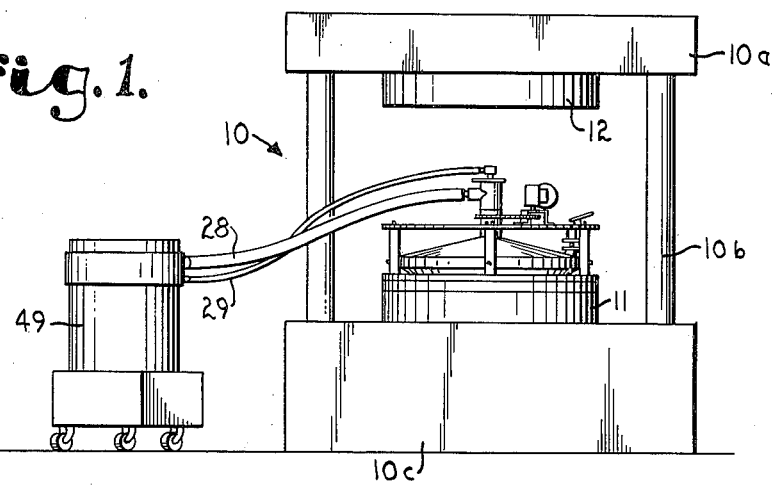
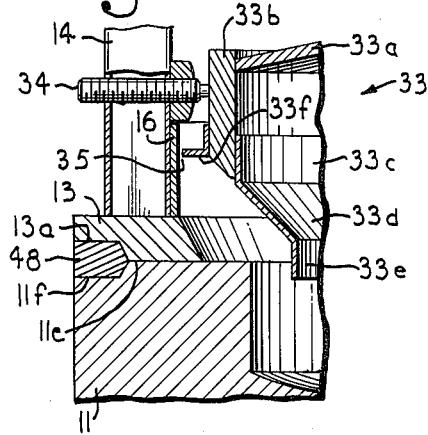
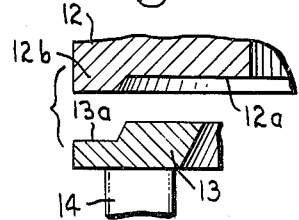
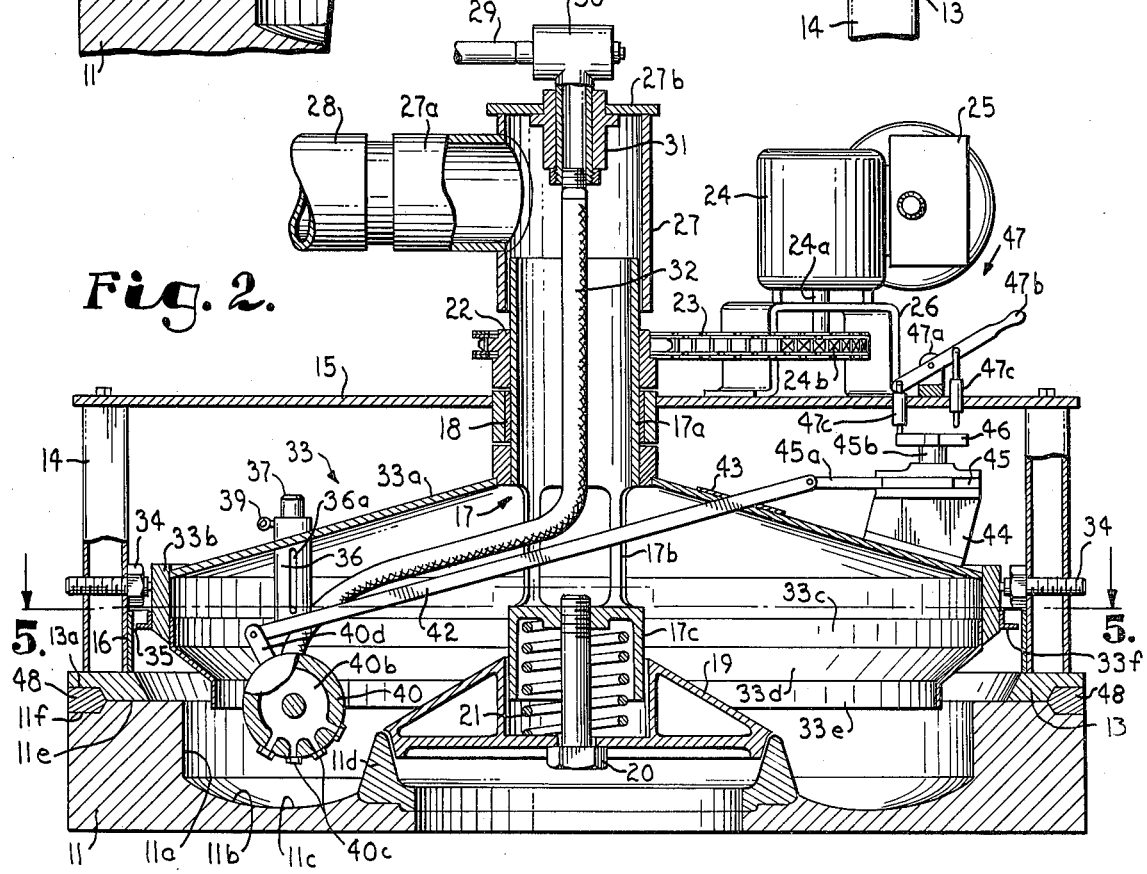

TIRE MOLD CLEANING APPARATUS

BACKGROUND AND SUMMARY OF THE INVENTION

In the manufacture of the modern tire, it is necessary to vulcanize the uncured or "green" tire by the simultaneous application of heat and pressure. Such a process is carried out with the aid of a tire press. The green tire, which is in the form of a barrel or keg having open ends, is automatically conveyed to the tire press in a modern manufacturing plant, and is concentrically positioned between separated tire molds, each being in the form of one half of the finished tire. As the two halves of the molds are moved together by the press, an inflatable bladder extending centrally into the green tire through the center opening of the lower half tire mold urges the green tire to conform to the shape of the tire mold. Hot fluid circulates within the bladder in order to effect the cure. After a specified time at a temperature and pressure sufficient to complete the vulcanization process, the upper tire mold is raised from the lower tire mold and the bladder is deflated to permit removal of the finished tire.

During repeated use of the press in the tire manufacture, a hard black residue builds up on the tire mold and unless removed, will cause defective or blemished tires to be produced. Accordingly, it is necessary to periodically clean the tire molds in order to remove the residue built up thereon. The present invention is primarily directed to this cleaning operation.

Heretofore the equipment and methods available for cleaning tire molds have been noticeably limited. By far the most common method of cleaning the tire molds requires removal of the molds from the tire press. The tire mold is then placed on a rotatable arbor and inserted into a cleaning cabinet where a directionally programmed blast of cleaning abrasive, typically in the nture of a glass bead similar in size and appearance to flour or dust, is directed toward a limited portion of the mold. As the mold is rotated, the nozzle direction is incrementally moved across the profile of the mold to effect complete cleaning.

The foregoing cleaning method is a formidable obstruction in obtaining maximum production rates within the plant. In a large plant, the entire press may be out of the production line for as long as sixteen hours to carry out the cleaning process. Four hours are normally required simply to remove the molds from the press. When one realizes that the capital investment in a single press may represent as much as $250,000, it is of paramount importance that the press downtime be held to an absolute minimum.

Of less significant impact is an alternative cleaning method which is manually performed. The abrasive blasting device includes a hand-held applicator which comprises a ring-shaped brush to be held in contact with the surface being cleaned. Within the brush is a blast nozzle through which abrasive and compressed air are discharged. A vacuum is simultaneously drawn through the brush in order to pick up the abrasive and any dislodged residue. Accordingly, the brush defines a circular curtain which contains the discharged abrasive and permits the vacuum to return same to the reclaim system. In the event the brush is not in complete contact with the surface being cleaned, however, the abrasive escapes from the immediate work area and must be picked up by other means. When working on flat surfaces, and when the brush is in complete contact with the surface, the vacuum is effective to pick up the residue and abrasive. However, when it is necessary to clean near edges or corners and the operator accidentally extends the brush over the edge of the object being cleaned, it is very frequent that abrasive will be lost and discharged in the work area. Any abrasive which is not recovered represents a substantial hazard that could possibly result in the manufacture of seriously defective tires. For this reason, and since the hand cleaning method is conducive to lost abrasive, the hand cleaning method is only minimally used in the industry.

Consequently, cleaning of the tire molds has long represented a vexing problem in the tire manufacture. There is a very definite need for a new method and apparatus for implementation of the cleaning process which is highly effective in cleaning of the tire mold and in the recovery of residue and spent abrasive, and which significantly reduces downtime of the tire mold in order to carry out the cleaning operation. A primary object of this invention is to accomplish such goals.

More particularly, an object of this invention is to provide a method of cleaning tire molds which may be more swiftly accomplished than the method heretofore employed in the tire industry. An important feature in carrying out this intent resides in cleaning the tire molds while installed in the tire press. Accordingly, at the very minimum, a substantial savings in press downtime is achieved since the time necessary to remove the tire molds from the press has been eliminated, and consequently, the time necessary to reinstall the molds into the tire press is also saved.

Another object of the invention is to provide a tire mold cleaning method of the character described which is highly effective in the recovery of dislodged residue and spent abrasive in order to completely remove such matter from the tire mold. Operation in this manner eliminates the danger of abrasive particles being subsequently molded into a tire resulting in a dangerously defective product.

Another object of the invention is to provide apparatus necessary to practice the tire mold cleaning process having the foregoing characteristics.

An additional object of the invention is to provide cleaning apparatus for the removal of vulcanization residue from a tire mold without requiring removal of the tire mold from the tire press. Such apparatus is adapted to overlie the tire mold and to employ the popular dry honing method of cleaning wherein a jet blast of abrasive is directed to and discharged upon the surface to be cleaned.

Yet another object of the invention is to provide a tire mold cleaning apparatus for the cleaning of tire molds while installed within an associated tire press. Such apparatus being equally well suited for the cleaning of the lower tire mold half, as well as the upper tire mold half.

A further object of the invention is to provide apparatus for efficiently cleaning residue from a tire mold held within a tire press in order to minimize the downtime of the press needed for the cleaning operation. Since the tire molds need not be removed from the press, a substantial savings in labor is immediately realized. Less downtime also permits more efficient production scheduling in order to achieve increased tire manufacture. An additional benefit resulting from the use of this tire mold cleaning apparatus is the elimination of damage and wear on the tire molds and the press itself resulting from the periodic removal and handling heretofore necessary in order to carry out the cleaning operation.

A further object of the invention is to provide apparatus for cleaning a tire mold mounted within a tire press and being highly efficient in the cleanup and removal of dislodged residue and spent abrasive from the tire mold. It is absolutely essential that such reclaim system be totally effective so that spent abrasive is not compounded into the tire manufacture resulting in a blemished and possibly dangerous tire. In carrying out this intent, the apparatus is sealed against the tire mold during the cleaning operation to prevent discharge of the abrasive into the work area. Air circumferentially sweeps the entire profile of the mold in order to return spent abrasive and dislodged residue to a reclamation system.

Other and further objects of the invention, together with the features of novelty appurtenant thereto, will appear in the course of the following description.

DESCRIPTION OF THE DRAWINGS

In the accompanying drawings, which form a part of the specification and are to be read in conjunction therewith, and in which like reference numerals are employed to indicate like parts in the various views:

FIG. 1 is an elevational view, partly schematic, of a tire mold cleaning apparatus constructed in accordance with a preferred embodiment of the invention and shown operatively connected to abrasive blasting and recovery equipment and shown received by a tire press to overlyingly engage the lower half tire mold to effect cleaning thereof;

FIG. 2 is a vertical sectional view through the tire mold cleaning apparatus;

FIG. 3 is an enlarged sectional view of the left side of the apparatus shown in FIG. 2 in order to better illustrate the details of construction;

FIG. 4 is a fragmentary view of the upper half tire mold and the outer engaging margin of the cleaning apparatus to illustrate the relationship of such members when the apparatus is utilized to clean the upper half tire mold;

Referring now to the drawings in more detail, and particularly to FIGS. 1, 2, and 4, attention is first directed to the environment in which the apparatus comprising the subject of this application will normally operate. FIG. 1 somewhat schematically illustrates a tire press 10 having an overhead portion 10a mounted on hydraulic rams 10b. The base portion 10c of the tire press receives a lower half tire mold 11 and the overhead portion 10a of the press has mounted thereon an upper half tire mold 12. During the tire manufacture, the hydraulic rams 10b are employed to lower the overhead portion 10a toward the base portion 10c and thereby bias the upper mold 11 to the lower mold 12. Upon completion of the vulcanization process, the overhead portion 10a is raised by the rams 10b to permit removal of the tire.

Figure 5:
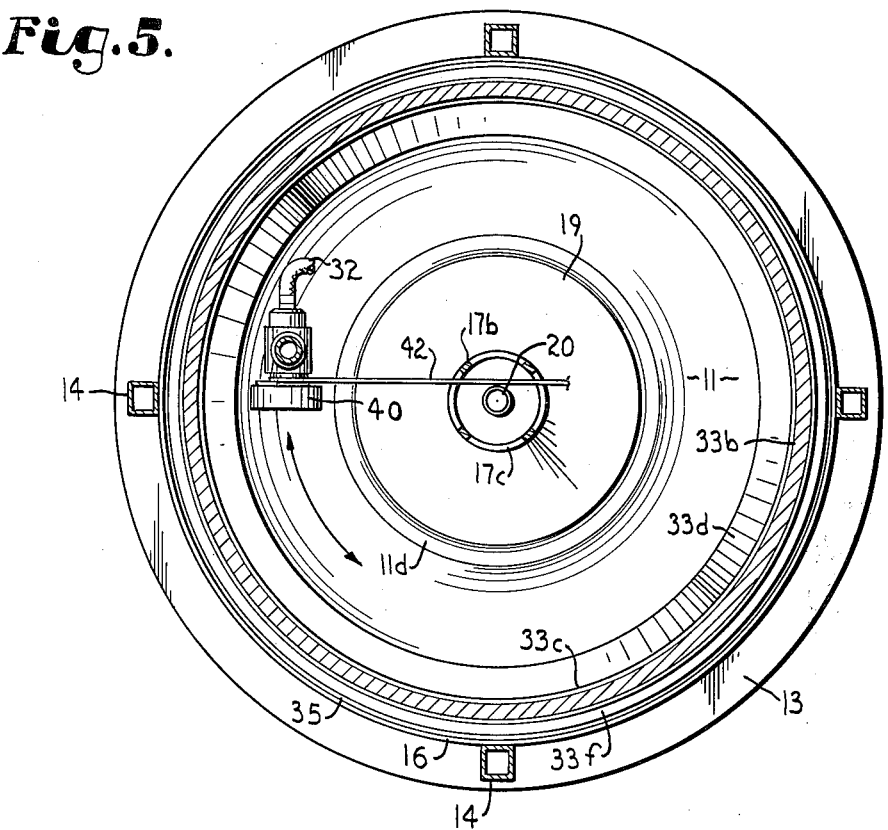
FIG. 5 is a horizontal view, partly sectional, of the apparatus taken along line 5—5 of FIG. 2 in the direction of the arrows.
Figure 6:
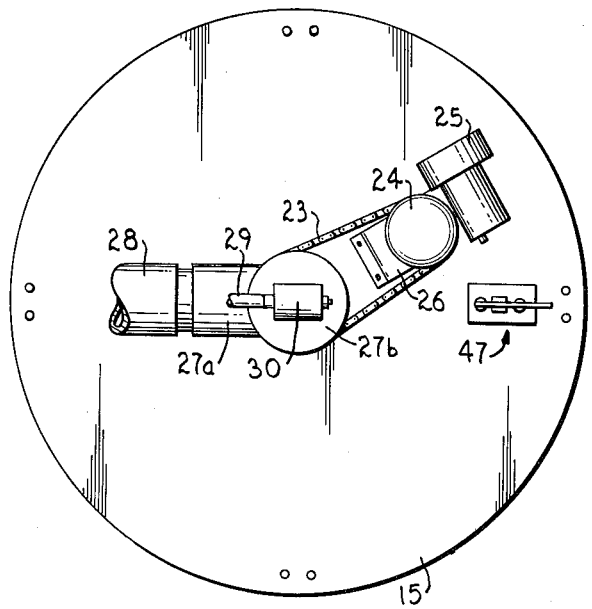
FIG. 6 is a reduced, top plan view of the apparatus as seen from above in FIG. 2.

With respect to the molding surface of the tire mold, each half 11 and 12 comprises identically dimensioned molding areas, each forming one half of the tire to be manufactured. Accordingly, each mold comprises (FIG. 2) a vertical tread section 11a which forms the tire tread, a curved shoulder portion 11b which represents the transition region from the tread section 11a to the side wall profile section 11c forming the side wall of the tire. The bead ring section 11d of the tire mold forms that portion of the tire which seats against the vehicle wheel.

Both the upper and lower molds 11 and 12 have seating surfaces 11e and 12a which mate when the molds are urged together by the press 10 during the tire manufacture. FIG. 2 illustrates the lower half tire mold 11 and FIG. 4 illustrates the seating margin 12a of the upper half tire mold 12. At the outer edge of the seating surface 11e of the lower mold 11 is a notched portion 11f which receives the circumferential rim 12b of the upper mold 12 when the halves are mated. The rim 12b of the upper half 12 and the notched portion 11f of the lower half 11 are referred to as the "mold register" and provide proper alignment between the molds as they are biased together by the tire press 10.

At the outset, it should be understood that the terms "upper" and "lower" merely provide a frame of reference for the drawings herein. The molds may naturally be reversed without changing the function or intended purpose of the apparatus and process.

Focusing attention now on the apparatus comprising the subject of the invention, reference is made to the frame-like support structure of the apparatus as shown in FIG. 2. Such structure basically includes a ring-shaped base member 13 adapted to overlie the seating margin 11e of the tire mold 11, a plurality of upright box-beam struts 14 which are affixed to the base member 13, and a circular plate 15 connected atop the struts 14 by bolts or the like. Affixed to the inside surfaces of the struts 14 adjacent the base 13 is a circular rim band 16.

Centrally disposed through the circular plate 15 is a hollow spindle 17 which is rotatably supported on the plate 15 by a sleeve bearing 18. The upper portion 17a of the spindle 17 is cylindrical in shape and extends in height above the circular plate 15 and below the circular plate 15 to a central web portion 17b of the spindle having lateral openings therethrough. The lower end of the web portion 17b is connected to a bottom spindle portion 17c in the shape of an inverted cup.

Removably secured to the cup 17c is a spring biased lobate shield 19 having a resilient face to seat against the bead ring 11d of the tire mold 11 and thereby blank out the center of the tire mold. The shield 19 is secured to the spindle 17 by means of a tensioning bolt 20 extending axially through the shield and secured to the cup portion 17c of the spindle. A spring member 21 disposed within the cup 17c urges the shield 19 away from the spindle 17 and to engagement with the bead ring 11d. The fit between the cup 17c and the shield 19 is sufficiently loose to permit rotation of the spindle 17 therein while the shield 19 is held stationary and sealed against the bead ring 11d.

Above the circular plate 15, the spindle 17 is fitted with a drive sprocket 22 around which is trained a drive chain 23 driven from the drive sprocket 24a mounted on the output shaft 24b of a gear reducer 24 which is connected to a drive motor 25. The gear box 24 and motor 25 are conventionally mounted to the circular plate 15 by means of a bracket or support assembly 26.

Fitted over the upper end of the spindle 17 is a free-floating exhaust elbow 27. The lateral extension 27a of the elbow 27 is connected to a vacuum hose 28. Atop the elbow a blast hose 29 is connected to a hose fitting 30 extending through the end cap 27b of the elbow 27. The hose fitting 30 is equipped with a rotary joint or swivel 31 which in turn is connected to a flexible blasting hose 32 extending centrally through the spindle 17. As will be seen, such fitting 31 is necessary to permit rotation of the blasting hose 32 without imparting rotation to the foregoing elbow 27 and associated connections.

Disposed beneath the circular plate 15 and radiating outwardly from the spindle 17 is a housing or hood structure 33 which substantially overlies the area of the tire mold 11 to define therewith an interior space or chamber. The hood 33 comprises a sloped cone portion 33a which is integrally attached to the cylindrical portion 17a of the spindle. The cone portion 33a extends outwardly, slightly past the tread portion 11a of the tire mold 11, and is attached to a vertical band 33b which is concentrically aligned within, and extends downwardly a sufficient distance to be adjacent to, the circular rim band 16 of the supporting frame. Adjustable bearing members 34 connected to each strut 14 engage the band 33b to maintain alignment of the hood 33 during rotation. Connected to the interior surface of the bearing band 33b is a circumferential rim 33c which is integral with an inwardly sloped, cone-shaped deflector 33d that extends at its upper end from a distance slightly greater than the diameter of the tread section 11a to a distance slightly less than the diameter of the tread section 11a. The lower end of the cone section 33d is integrally connected to a circular lip 33e which extends into the tire mold a distance slightly beneath the seating margin 11e.

Attached to the exterior surface of the bearing band 33b is an L-shaped flange 33f lying adjacent the circular rim band 16 of the supporting frame and, in conjunction therewith, providing a peripheral gap 35 around the tire mold 11 to establish an air flow passage to the region confined between the tire mold 11 and the foregoing hood structure 33.

Disposed beneath the hood 33 and positioned above the side wall profile 11c of the tire mold 11 is the abrasive applicator assembly now to be described. A cylindrical sleeve 36 is vertically disposed through the cone portion 33a of the hood and is equipped with diametrically opposed elongate slots 36a. A rod member 37 is telescopingly received within said sleeve and is held by a guide pin 38 which extends radially through the rod 37 with the ends of the pin 38 projecting into the elongate slots 36a of the sleeve. The rod 37 may be fixed at preselected heights with respect to the sleeve 36 by means of a set or thumb screw 39 threadably received by the sleeve 36 to engage the rod 37.

Figure 7:
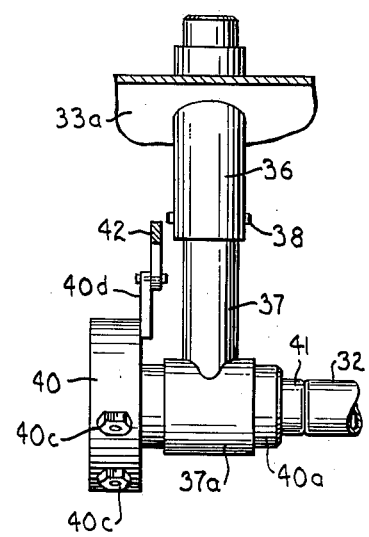
FIG. 7 is an enlarged side view of the abrasive nozzle assembly.

As best viewed in FIG. 7, the lower end of the rod 37 is fitted with a circumferential band 37a which holds the rear tubular extension 40a of a spray nozzle head or manifold 40. The previously mentioned flexible hose 32 extending centrally through the spindle 17 is connected by a hose fitting 41 to the rear extension 40a of the nozzle head 40. The central cavity 40b of the applicator head 40 leads to a plurality of discharged ports or nozzles 40c radially spaced on approximately one quarter of the circumferential edge of the head 40.

Projecting outwardly from the nozzle head 40 is an arm 40d which is pivotally pinned to a linkage rod 42 extending through the openings in the web portion 17b of the spindle and through an opening in the cone portion 33a of the hood approximately diametrically opposite the location of the abrasive applicator assembly. The opening through which the linkage rod 42 is disposed is sealed by means of a resiliently flexible grommet 43.

Mounted on the exterior surface of the cone portion 33a of the hood is a bracket 44 which horizontally carries a rack and pinion gear 45 (FIG. 2). The outer end of the rack 45a is pivotally pinned to the linkage arm 42. Keyed to the shaft 45b extending upwardly from the pinion (not shown) is a horizontally oriented star gear 46. Rotation of the star gear 46, therefore, is translated through the rack and pinion gear 45 to displacement of the linkage arm 42 in order to angularly vary the direction of discharge of the nozzle head 40.

The mechanism 47 for angularly advancing the star gear 46 is located on the circular plate 15 and is positioned outwardly from the spindle 17 a distance approximately equal to the distance the star gear 46 is positioned from the spindle 17. A bracket member 47a is attached to the circular plate 15 and pivotally carries a lever 47b on which a pair of downwardly depending plungers 47c are hingedly mounted. One plunger 47c is mounted on each side of the central pivot of the lever 47b and each extends through an opening in the circular plate 15. Either of the plungers 47c, therefore, selectively positioned to contact the teeth of the star gear 46 in such a manner that the star gear 46 is incrementally rotated a specific angular displacement as the gear 46 travels in an arc past the plunger 47c during rotation of the hood 33. In other words, upon each complete rotation of the hood 33, the star gear 46 will engage the plunger 47c in the lower position which will cause a rotational displacement of the gear 46 in order to vary the direction of discharge of the spray head 40.

Accordingly, as the hood 33 rotates in the same direction, one plunger 47c will cause rotational advancement of the spray head 40 toward the tread section 11a of the tire mold 11 and the opposite plunger 47c will cause advancement of the head 40 toward the bead ring 11d of the mold, depending upon where the lever 47b is positioned. End portions of the rack 45a of the rack and pinion gear 45 may be blanked in order to prevent binding in operation until the lever 47b can be adjusted to lower the opposite plunger 47c and start movement of the nozzle head 40 in the reverse direction.

It will be apparent to any skilled mechanic that the mechanism for controlling the directional discharge of the nozzle head 40 and of varying the position thereof may take on several forms, of which the foregoing is but an example. Advancement of the nozzle head 40 may be controlled by a timer in lieu of control based on revolutions of the hood 33. Likewise, the motive force employed to rate the nozzle head 40 may be accomplished by an electric reversing motor in lieu of the mechanical linkage indicated.

Attention is again directed to the ring-shaped base 13 of the supporting structure in its engagement with the seating surface of the tire mold. The lower surface of the base 13 is provided with a notched out portion 13a of similar dimension as the notched out portion 11f of the lower tire mold 11. With such configuration, the base member 13 as shown in FIG. 4 is adapted to mate with the upper half tire mold when the apparatus is inverted and biased to engagement with the upper mold 12. In such application, the circumferential rim 12b of the upper mold 12 is received by the notched area 13a of the base member 13.

On the other hand, when the apparatus is employed to clean the lower mold 11 as shown in FIG. 2, a separate adaptor ring 48 is provided to engage the notched area 11f of the lower mold 11 and the notched area 13a of the base member 13 to insure a snug fit and proper alignment of the apparatus to the tire mold 11.

With respect to the conventional blasting and vacuum equipment used in conjunction with our tire mold cleaning apparatus, such equipment may be separate units. That is, blasting equipment may be connected to the blasting hose 29 and a separate vacuum unit may be employed to provide the vacuum through the line 28 from the elbow fitting 27. Nevertheless, it is probably most commercially attractive to employ a single unit 49, such as schematically illustrated in FIG. 1, which provides both a blast of compressed air with glass beads through line 29 and a vacuum through line 28 and includes a reclaim system to recover spent abrasive. Such equipment is available as a self-contained unit and is commercially manufactured by the Vacu-Blast Company, Inc. of Belmont, Cal.

In operation the tire mold cleaning apparatus may be employed in the following manner in order to clean vulcanization residue from a tire mold. In the event the lower mold 11 is to be cleaned first, the adaptor ring 48 is placed around the mold 11 to mate with the notched area 11f. The apparatus itself is then overlyingly placed on the mold 11 with the base member 13 seating against the upper surface of the adaptor ring 48 and with the margin portion 11e of the mold. Vacuum equipment is connected to vacuum line 28 and a blasting generator to deliver compressed air and an abrasive such as glass bead is connected to the blasting line 29. Alternatively, as previously indicated, the apparatus may be connected, via the same hoses 28 and 29, to a single unit comprising both a blasting generator and a vacuum unit equipped with an abrasive reclaim system.

Operation of the motor 25 imparts rotation to the spindle 17 and hood structure 33 by means of the previously described gear and drive linkages and by the drive chain 23 trained around the sprocket 22 mounted on the spindle 17. Accordingly, the hood structure 33 is caused to rotate and is held in concentric alignment above the mold 11 by means of the bearing members 34 mounted on the struts 14. Likewise, the nozzle head 40, carried by the hood 33, rotates above the molding surface of the mold 11 and the flexible hose 32 rotates at the elbow fitting 27 by means of the swivel connection 31. The elbow 27 does not rotate in response to rotation of the spindle 17, but remains stationary due to the loose and slipping engagement with the spindle 17 and also by the retarding forces supplied by connection with hoses 28 and 29. Similarly, although the spindle 17 rotates, the lobate shield 19 remains stationary due to the loose and slipping engagement with the spindle 17 and also by the retarding forces supplied by frictional and sealing engagement with the bead ring 11d.

Simultaneous with the rotation of the hood 33, the blasting unit is operated to deliver compressed air and abrasive through the blast hose 29 from which the abrasive and air is delivered through the connection 30 and travels downwardly through the flexible hose 32 into the chamber 40b of the nozzle head where the material is discharged through the nozzle jets 40c directed toward the molding surface of the mold 11. Impact of the abrasive, forcefully delivered by the compressed air, dislodges the vulcanization residue from the mold in accordance with the observed principles of the dry honing process.

Rotation of the hood 33 accordingly causes the star gear 46 connected to the rack and pinion gear 45 to rotate past the nozzle head control mechanism mounted on the circular plate 15.

Before initiating the cleaning cycle, the nozzle head 40 is normally adjusted to its limit in one direction. That is, the head 40 is turned to its limit toward either the bead ring 11d or toward the tread section 11a. For purposes of illustration, it is assumed that the nozzle head 40 is first directed toward the bead ring 11d. The lever 47b is adjusted to lower the plunger 47c which will contact the star gear 46 upon each revolution of the hood 33 in order to angularly adjust the head 40, by means of displacement of the rack 45a transmitted through the linkage rod 42 to cause the head 40 to incrementally turn toward the tread section 11a.

Once the hood structure 33 has rotated a sufficient number of revolutions whereby the spray head 40 traverses the entire area of the mold from the bead ring 11d to the tread section 11a, and has reached the blanked portion of the rack 43a in order that further angular displacement toward the tread section 11a is no longer achieved, then the operator may move the lever 47b to lower the opposite plunger 47c and thereby cause the head 40 to be angularly displaced upon each successive revolution of the hood structure 33 from the tread section 11a to the bead ring 11d if a second pass across the mold 11 is necessary to effect complete cleaning.

Simultaneous with rotation of the hood 33 and with operation of the blast generator, the vacuum unit is operated to draw a vacuum through the hose 28.

By virtue of the vacuum so established, air is sucked through the peripheral gap 35 defined by the circular rim band 16 of the support frame and the L-shaped flange 33f attached to the hood 33. Accordingly, air is continuously pulled through the gap 35 and downwardly between the rim band 16 and base 13 and the lower portion of the hood 33 to sweep the entire area of the mold from the tread section 11a past the shoulder portion 11b, through the side wall profile 11c, and then up the bead ring 11d to pick up and remove any spent abrasive discharged from the head 40, along with any dislodged residue, and to carry the spent abrasive and residue upwardly through the web portion 17b of the spindle and then upwardly, centrally through the spindle 17, to the elbow 27 where such material is carried from the apparatus through the lateral extension 27a and delivered to the vacuum unit which, as previously indicated, may include an abrasive recovery system.

When the vulcanization residue has been dislodged and removed from the mold 11, the apparatus may be removed from the lower mold 11 and employed to clean the upper mold 12. Any loose residue or spent abrasive remaining in the mold 11 may be removed with a hand vacuum. In cleaning the upper mold 12, the apparatus is inverted and biased to the upper mold 12 by means of jacks or other conventional compressive equipment to hold the apparatus to engagement with the upper mold 12. Here, the adaptor ring 48 is not employed, since the base 13 is so configured with a notched portion 13a as to receive the circumferential rim 12b of the mold 12. The remainder of the operation proceeds as that described with respect to the lower mold 11.

Based on the foregoing embodiment, several structural design modifications will now be readily apparent to those skilled in this art in carrying out our intent in providing apparatus for cleaning a tire mold mounted within a tire press. As previously mentioned, alternative adjustment mechanisms are available for directionally controlling the abrasive discharge. In addition, one may alternatively construct a stationary hood structure wherein the applicator itself rotates in order to effectively cover the molding surface.

It will be noted that in carrying out the cleaning method employing apparatus of this genre, the tire molds remain installed in the tire press at all times, and the only time necessary to carry out the cleaning process is time devoted to the actual cleaning of the mold itself, instead of the time heretofore necessary to remove the tire mold from the press and then to reinstall the mold after it was cleaned.

By providing a hood structure 33 and the peripheral gap 35 through which air is continuously pulled by means of a vacuum in order to sweep the entire surface of the mold, the possibility of residue and spent abrasive escaping the confines of the mold is entirely eliminated. Any spent abrasive which may not be returned to the vacuum system and which may remain in the mold can easily be picked up with a hand vacuum when the apparatus is removed from the mold. Accordingly therefore, the entire work area and the molds themselves are completely free of spent abrasive at the conclusion of the cleaning operations, thus eliminating the possibility of a potentially dangerous work area provided by escaped abrasive and further eliminating the possibility of a blemished and potentially dangerous tire being subsequently manufactured.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

We claim:

1. A tire mold cleaning apparatus for removing vulcanization residue from the molding surface of a tire mold having a circular central portion and mounted in a tire press, said apparatus comprising:
    a supporting frame including a circular base adapted to sealably engage said tire mold;
    a circular housing mounted on said supporting frame and adapted to concentrically overlie said tire mold to define an interior chamber, said housing spaced apart from said circular base to define therewith a continuous annulus passageway communicating with said interior chamber;
    a closure member connected to said circular housing and adapted to sealably engage the central portion of said tire mold;
    an abrasive applicator disposed within said interior chamber and having an abrasive discharge port;
    abrasive blast generating means for delivering cleaning abrasive to said abrasive applicator whereby said abrasive is discharged through said discharge port to strike the molding surface of said tire mold to dislodge vulcanization residue therefrom; and
    vacuum means connected to said housing for drawing a vacuum on said interior chamber whereby air is pulled through said annulus passageway to sweep the molding surface and pick up abrasive discharged from said applicator and dislodged vulcanization residue.

2. The apparatus as in claim 1, said closure member including biasing means for urging said closure member away from said housing and a resilient sealing member adapted to engage the central portion of said tire mold when said member is biased to engagement therewith by said biasing means.

3. The apparatus as in claim 1, said abrasive applicator mounted on said circular housing within said interior chamber and said housing rotatably mounted on said supporting frame, and said apparatus further including power means mounted on said supporting frame and operatively connected to said housing for rotatably driving said housing, whereby said applicator is rotatably carried in a circular orbit while cleaning abrasive is discharged through said discharge port to strike the molding surface of said tire mold to dislodge vulcanization residue.

4. The apparatus as in claim 3, including discharge adjustment means connected to said applicator for adjustably varying the direction of abrasive discharge.

5. The apparatus as in claim 1, said applicator rotatably mounted within said interior chamber to move in a circular orbit while cleaning abrasive is discharged through said discharge port to strike the molding surface of said tire mold to dislodge vulcanization residue.

6. The apparatus as in claim 5, including discharge adjustment means connected to said applicator for adjustably varying the direction of abrasive discharge.

7. A tire mold cleaning process for removing vulcanization residue from the molding surface of a tire mold mounted in a tire press, said process comprising the steps of:
    providing an abrasive confinement region integral with the molding surface of said tire mold;
    blasting, within said confinement region, an abrasive onto the molding surface of said tire mold in order to dislodge vulcanization residue therefrom;
    establishing a continuous air passageway contiguous with the molding surface of said tube and communicating with said confinement region; and
    pulling a vacuum on said confinement region whereby air rushes through said passageway to sweep the molding surface and to remove spent abrasive and dislodged residue therefrom.

* * * * *